(12) United States Patent
Wastell et al.

(10) Patent No.: US 8,443,762 B2
(45) Date of Patent: May 21, 2013

(54) METHOD OF FEEDING DIFFERENT DIETS TO DIFFERENT GROUPS OF PIGS

(76) Inventors: Marvin Wastell, Omaha, NE (US); Chad Wastell, Omaha, NE (US); Allan Schinckel, West Lafayette, IN (US); Mark Einstein, Lafayette, IN (US)

( * ) Notice: Subject to any disclaimer, the term of this patent is extended or adjusted under 35 U.S.C. 154(b) by 172 days.

(21) Appl. No.: 12/931,122

(22) Filed: Jan. 25, 2011

(65) Prior Publication Data

US 2011/0180018 A1 Jul. 28, 2011

Related U.S. Application Data

(60) Provisional application No. 61/336,785, filed on Jan. 27, 2010.

(51) Int. Cl.
*A01K 1/00* (2006.01)
*B65G 11/00* (2006.01)
(52) U.S. Cl.
USPC .......................................... 119/843; 119/436

(58) Field of Classification Search
USPC ................... 119/843, 840, 842, 416, 436, 444
See application file for complete search history.

(56) References Cited

U.S. PATENT DOCUMENTS 7,210,428 B2 5/2007 Thibault
2003/0226522 A1* 12/2003 Thibault ....................... 119/842
2007/0193523 A1 8/2007 Thibault

* cited by examiner

*Primary Examiner* — Monica Williams
(74) *Attorney, Agent, or Firm* — Dennis L. Thomte; Thomte Patent Law Office LLC

(57) ABSTRACT

A method of feeding different diets to different groups of pigs is disclosed which includes a two-way or three-way sorter in combination with a walk-through scale which directs pigs into different feed courts to feed the same different diets depending on their detected weights. The detected weights of the pigs are compared to weight set points of a pig weight growth curve in the software of the microprocessor associated with the invention.

3 Claims, 4 Drawing Sheets

METHOD OF FEEDING DIFFERENT DIETS TO DIFFERENT GROUPS OF PIGS

CROSS-REFERENCE TO RELATED APPLICATION

This application claims the benefit of provisional patent application Ser. No. 61/336,785, filed Jan. 27, 2010 by the present Applicants.

BACKGROUND OF THE INVENTION

1. Field of the Invention

This invention relates to a method of feeding different diets to at least two groups of pigs and preferably three groups of pigs, namely light, medium and heavy pigs. More particularly, the invention relates to the sorting of pigs into different feed courts based on a comparison of the detected weight of a pig passing through a walk-through scale and sorting gate with the weight set point of a pig weight growth curve for the particular date that the pig is passing through the walk-through scale and sorting gate.

2. Description of the Related Art

Many prior art methods have been previously provided for feeding different diets to different groups of pigs so that a majority of the pigs will have approximately the same weight at the end of the finishing program for marketing purposes. A typical prior art method of feeding different diets to different groups of pigs is disclosed in U.S. Pat. No. 7,210,428 which issued on May 1, 2007. In the '428 Patent, the pigs pass through a walk-through scale and sorting gate and are sorted into different feed courts or areas depending on whether they are heavier or lighter than the value of calculated sorting weight using detected weights of the pigs during a predetermined previous time interval. To the best of Applicants' knowledge, in the '428 Patent, the pigs are sorted by weight without any consideration being given to the age of the pigs, the genetics of the pigs, or other considerations such as barn temperature. Further, it is not believed that the method of the '428 Patent takes into consideration a pig weight growth curve which sets forth weight set points for particular days during the finishing process.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The method of feeding different diets to at least two groups of pigs is described and which comprises the steps of: (a) providing a barn having a lounging area, a first feed court and a second feed court with the first and second feed courts being separated from one another and with each of the first and second feed courts having an entrance and a one-way exit gate; (b) the one-way exit gate of the first feed court permitting pigs in the first feed court to enter the lounging area from the first feed court; (c) the one-way exit gate of the second feed court permitting pigs in the second feed court to enter the lounging area from the second feed court; (d) providing a walk-through scale having an inlet open to the lounging area and first and second outlets open to the entrances of the first and second feed courts respectively with the walk-through scale having a sort gate for selectively directing pigs into the first and second feed courts based on a comparison of the detected weight of the pig and the weight set point of a pig weight growth curve for the particular date that the pig is passing through the walk-through scale; (e) actuating the sort gate to direct pigs having a detected weight below the weight set point of a pig weight growth curve for that particular date into the first feed court; (f) actuating the sort gate to direct pig gates having a detected weight above the weight set point of the pig weight growth curve for that particular date into the second feed court; (g) feeding different diets to the pigs in the first and second feed courts; (h) repeating the sorting process each time a pig passes through the walk-through scale.

In the preferred embodiment, the pig weight growth curve may be changed according to one or more variables such as genetics of pigs, ages of the pigs, barn temperature, etc.

The sort gate is controlled by a microprocessor-based controller which includes pig weight growth curve software. The sort weight is changed periodically to correspond with the date indicated on the pig weight growth curve. In the preferred embodiment, the sort weight is changed daily at midnight to correspond to the date indicated on the pig weight growth curve.

In the preferred embodiment, the sorting of the pigs is such that approximately an equal number of pigs will be sorted into each of the food courts.

A third food court may be provided with the sort gates selectively directing the pigs into the three food courts to provide food courts for heavy, medium and light pigs. The sort gate may also direct a different percentage of pigs into each of the food courts as desired.

It is therefore a principal object of the invention to provide an improved method of feeding different diets to at least two groups of pigs.

A further object of the invention is to provide a method of feeding different diets to different groups of pigs based on a pig weight growth curve.

A further object of the invention is to provide a method wherein the weight set points of a pig weight growth curve is provided for particular days during the finishing process.

A further object of the invention is to provide a method of the type described wherein the pig weight growth curve may be changed according to one or more variables such as genetics, ages and barn temperature.

Yet another object of the invention is to provide a method of the type described wherein the sort gate thereof is controlled by a microprocessor-based controller with the microprocessor including pig weight growth curve software.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED METHOD

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
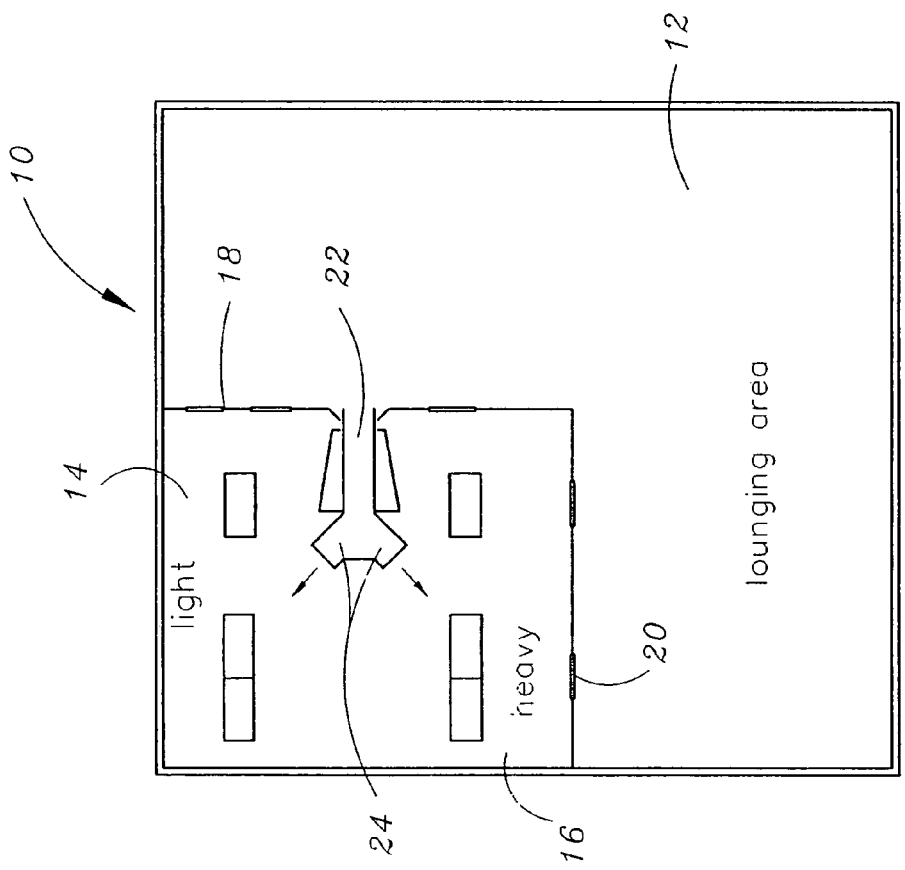
FIG. 1 is a schematic illustrating a barn having a lounging area and first and second feed courts.
Figure 5:
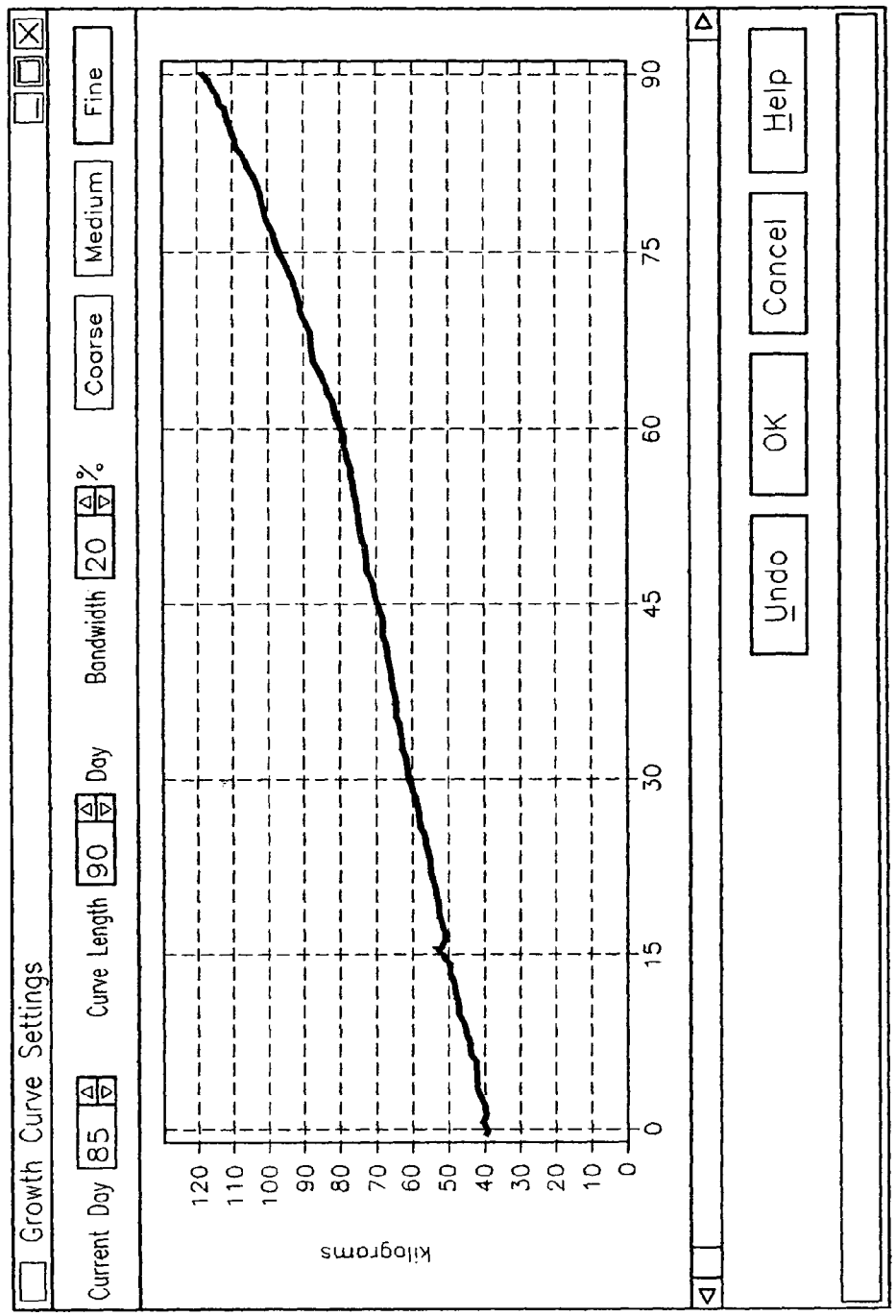
FIG. 5 is a print out of a pig weight growth curve.

FIG. 1 illustrates a typical barn layout which is referred to by the reference numeral 10. The barn includes a lounging area 12, a first feed court 14 for light pigs and a second feed court 16 for heavy pigs. Feed court 14 is provided with at least a single one-way exit gate 18 which permits pigs in feed court 14 to pass therefrom into the lounging area 12. Feed court 16 has at least a single one-way exit gate 20 provided therein to permit the pigs in the feed court 16 to pass therefrom to the lounging area 12. The numeral 22 refers to a conventional walk-through scale having an inlet end in communication with the lounging area 12 and an outlet end in communication with a conventional two-way sorting gate 24 which may direct pigs into either the feed court 14 or the feed court 16 depending upon the detected weight of the pig passing through the walk-through scale 22. The sorting gate is controlled by a conventional microprocessor-based controller which includes pig weight growth curve software therein. FIG. 5 is a printout of a pig weight growth curve with the X axis thereof corresponding to days of the finishing cycle and the Y axis thereof referring to the weight set point of the pig weight growth curve. For example, at day zero of the finishing cycle, the weight set point is approximately 40 kilograms. It is also seen in FIG. 5, the weight set point for day 90 is approximately 120 kilograms.

Assuming that it is day zero of the finishing cycle, as a pig passes through the walk-through scale and has a detected weight of 30 kilograms, the sorting gate will be activated to send the light pig into feed court 14 for a more potent ration or diet. If the detected weight of the pig passing through the walk-through scale is 50 kilograms, the sorting gate will be actuated by the microprocessor so that the pig is directed into the feed court 16 since the pig is considered a heavy pig since the pig has a weight greater than the weight set point of 40 kilograms.

Preferably, the weight set points will be changed by the microprocessor or software each day at midnight. Thus, if a pig walks through the scale on day 15 of the finishing cycle and has a detected weight of 40 kilograms, that pig will be directed into the light feed court 14 since the weight set point is approximately 50 kilograms. If that pig had weighed more than the 50 kilogram weight set point of FIG. 5, the pig would be diverted or directed into the heavy feed court 16.

Figure 4:
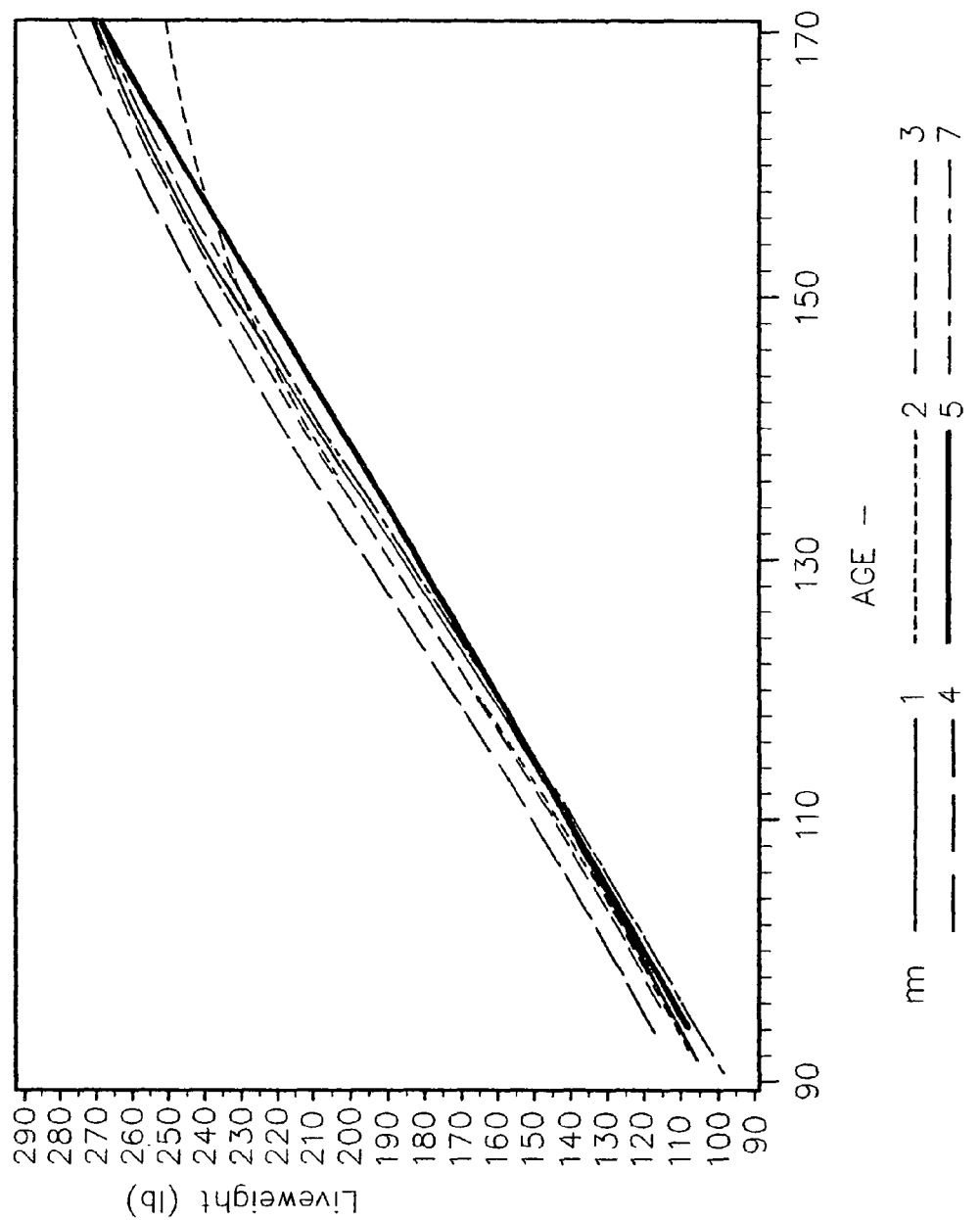
FIG. 4 is a growth curve for seven different ages of pigs that are being fed at the same time.

FIG. 4 is a growth weight curve which is based on experience with finishing pigs having different ages when placed into the barn.

Figure 2:
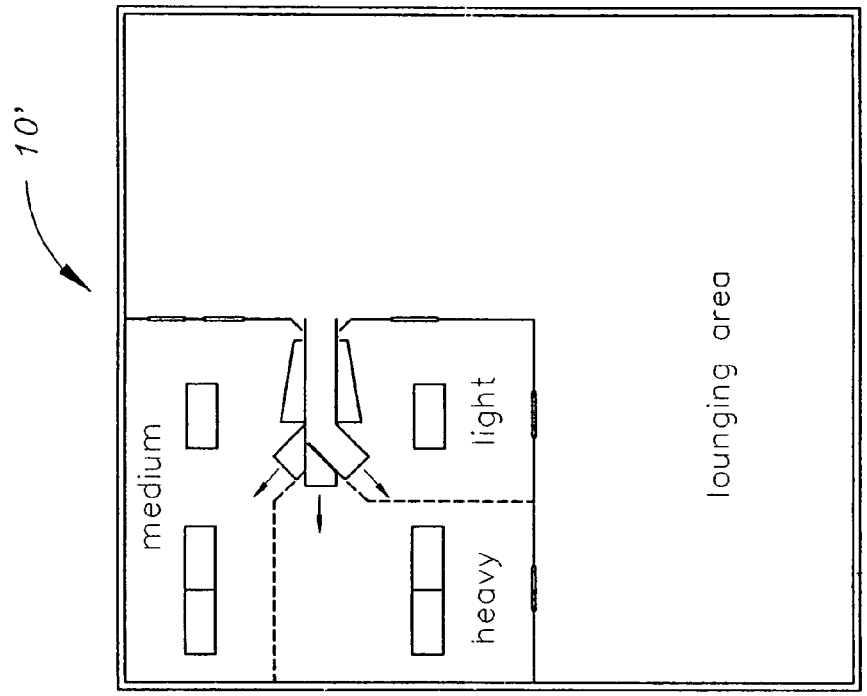
FIG. 2 is a schematic similar to FIG. 1 except that three feed courts are provided.

FIG. 2 is a schematic of a barn layout and which is referred to generally by the reference numeral 10'. The only difference between the barn layout of FIG. 2 with that of FIG. 1 is that FIG. 2 illustrates a three-way sorter 24' to direct the pigs into light, medium and heavy food courts based on the detected weight of the animal and the weight set points of the pig weight growth curve software for that particular date. The software may be designed so that approximate equal numbers of pigs are placed in each of the food courts or placed therein according to the size of the food court. The software may also sort the pigs into the food courts based on the percentage such as 40 percent in one food court, 30 percent in another food court and 30 percent in another food court if three feed courts are used. The software is also capable of adjusting the weight set points on a daily basis for variables such as age of pigs, genetics of the pigs, and barn temperatures.

Figure 3:
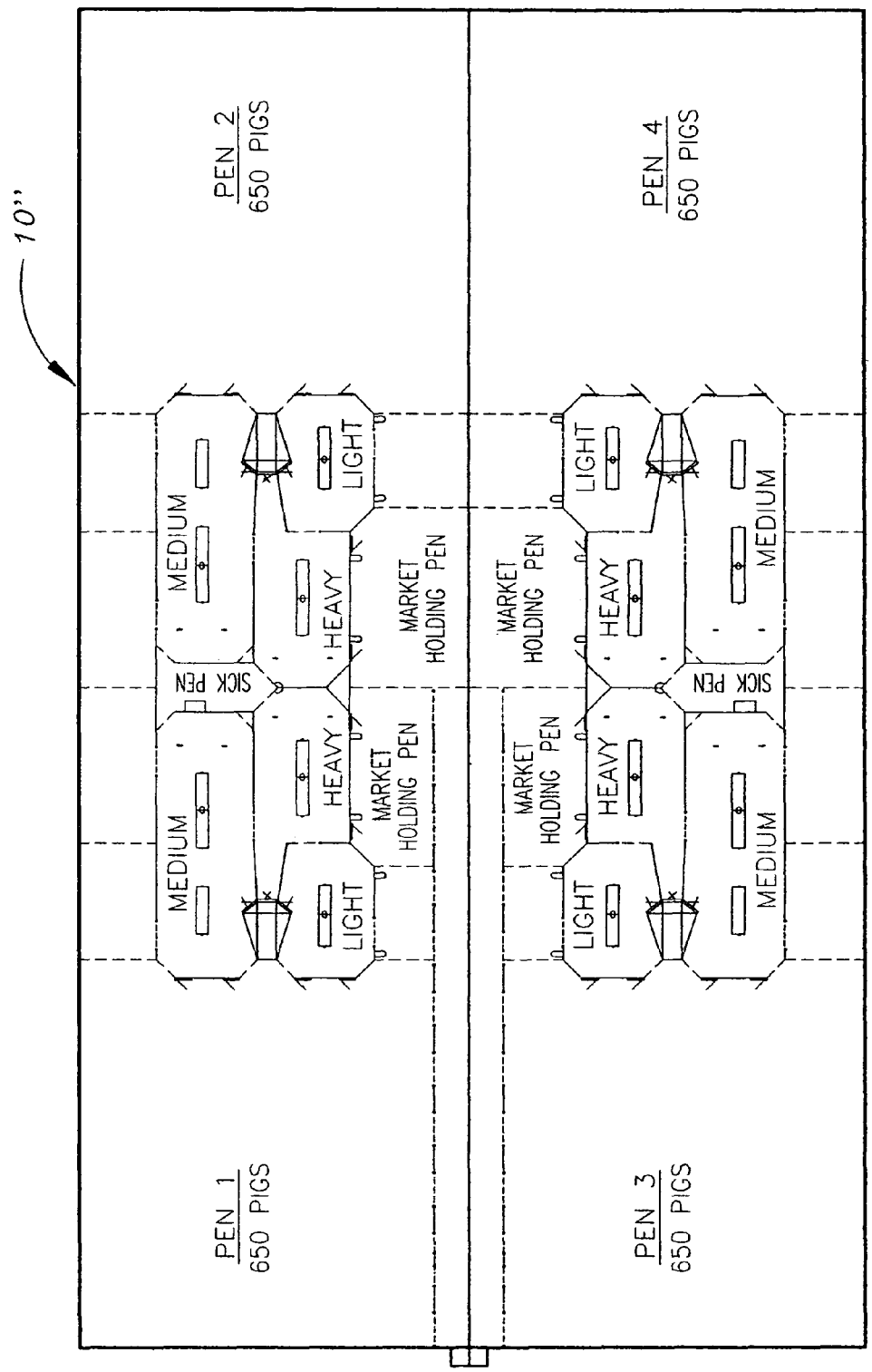
FIG. 3 is a schematic of a typical barn layout having four pens with each of the pens having the capability of sorting the pigs into light, medium and heavy groups of pigs so that different diets may be fed thereto.

FIG. 3 is a schematic illustrating a further barn layout which is referred to generally by the reference numeral 10". As seen in FIG. 3, the barn layout includes four pens identified as pen one, pen two, pen three and pen four, with each of the pens having three-way sorters provided therein.

Thus it can be seen that the method of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A method of feeding different diets to at least two groups of pigs, comprising:
   providing a barn having a lounging area, a first feed court and a second feed court with the first and second feed courts being separated from one another and with each of the first and second feed courts having an entrance and a one-way exit gate;
   the one-way exit gate of the first feed court permitting pigs in the first feed court to enter the lounging area from the first feed court;
   the one-way exit gate of the second feed court permitting pigs in the second feed court to enter the lounging area from the second feed court;
   providing a microprocessor including pig weight growth curve software configured to create a pig weight growth curve with X and Y axes with the X axis thereof corresponding to the days of a finishing cycle and the Y axis thereof referring to a weight set point of the pig weight growth curve;
   providing a walk-through scale having an inlet open to the lounging area and first and second outlets open to the entrances of the first and second feed courts respectively with the walk-through scale having a sort gate which is controlled by the microprocessor to selectively direct pigs into the first and second feed courts based on a comparison of the detected weight of the pig and the weight set point of the pig weight growth curve for the particular date that the pig is passing through the walk-through scale;
   actuating the sort gate to direct pigs having a detected weight of below the weight set point of the pig weight growth curve for that particular date into the first feed court;
   actuating the sort gate to direct pigs having a detected weight above the weight set point of the pig weight growth curve for that particular date into the second feed court;
   feeding different diets to the pigs in the first and second feed courts;
   repeating the sorting process each time a pig passes through the walk-through scale and;

changing the pig weight growth curve according to one or more variables.

2. The method of claim 1 wherein the sort weight is changed daily to correspond to the date indicated on the pig weight growth curve.

3. The method of claim 1 wherein a third food court is provided and wherein the sort gate selectively directs the pigs into the three food courts to provide food courts for heavy, medium and tight pigs.

* * * * *